July 15, 1941.　　　R. N. HAYES　　　2,249,655
VERNIER DEVICE
Filed June 2, 1939
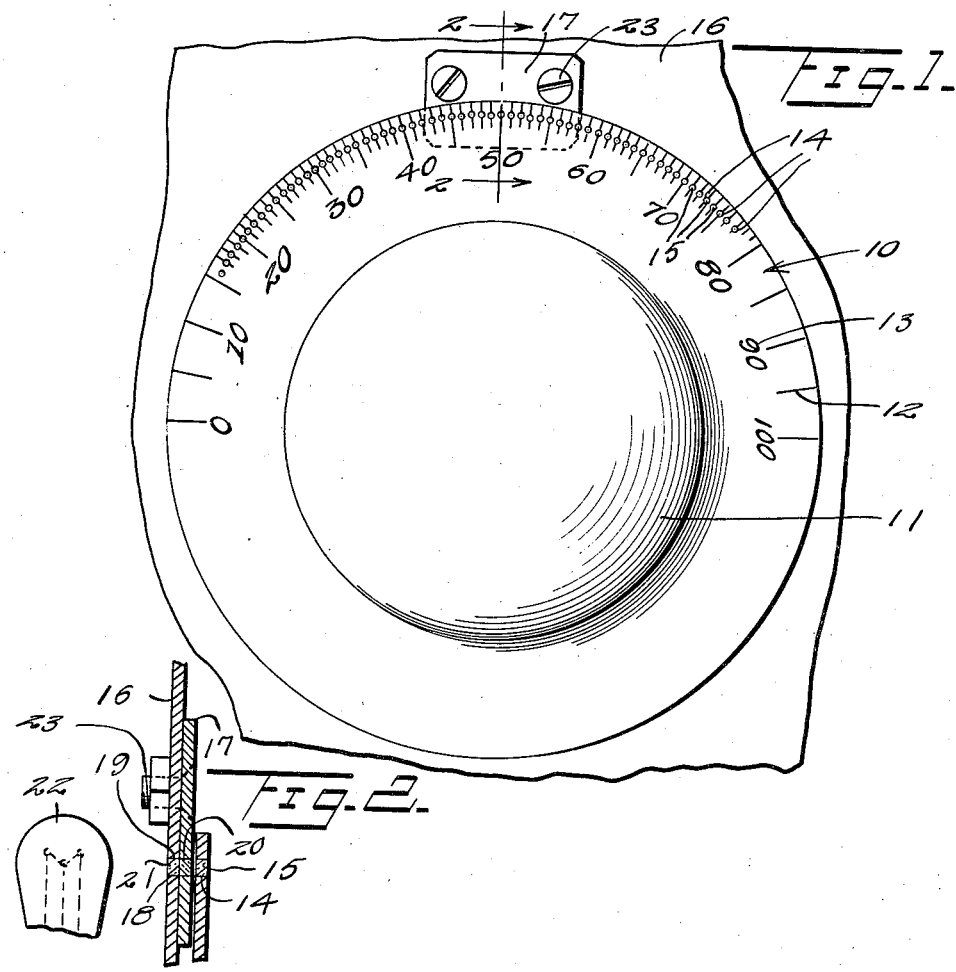
Inventor
R.N.Hayes
By Kimmel & Crowell
Attorneys Patented July 15, 1941

2,249,655

UNITED STATES PATENT OFFICE 2,249,655

VERNIER DEVICE

Ross Ney Hayes, Abilene, Tex.

Application June 2, 1939, Serial No. 277,099

3 Claims. (Cl. 116—130)

This invention relates to vernier devices and more particularly to an improved vernier means for use with various devices.

An object of this invention is to provide an improved vernier means wherein the movement of one member relative to another can be more accurately calculated or controlled than is at present possible through the use of registering scale marks.

Another object of this invention is to provide a vernier means using light rays projected through registering passages so that the user of the device can more accurately determine the position of one element relative to another.

A further object of this invention is to provide a vernier device of this kind wherein the passages may be filled with transparent means so as to prevent dust or dirt particles from entering the passages and thus disturbing the passage of light rays therethrough.

A further object of this invention is to provide a vernier device of this kind which can be used with either circumferential scales or linear scales.

A still further object of this invention is to provide a stationary member and a movable member, each of the members being provided with passages which are adapted to be selectively moved into registery one with another and to provide means for projecting light rays through the registering passages in order to more accurately determine the relative position of one member relative to another.

To the foregoing objects and to others which may hereinafter appear, the invention consists of the novel construction, combination and arrangement of parts as will be more specifically referred to and illustrated in the accompanying drawing wherein are shown embodiments of this invention, but it is to be understood that changes, variations and modifications may be resorted to which fall within the scope of the invention as claimed.

In the drawing:

Figure 1 is a detail front elevation of a vernier means constructed according to an embodiment of this invention used in combination with a rotatable dial and a stationary member, and Figure 2 is an enlarged fragmentary sectional view taken on the line 2—2 of Figure 1.

Referring to the drawing and first to Figure 1, the numeral 10 designates generally a dial which has a vernier knob 11 mounted axially thereof. The dial 10 adjacent the periphery thereof is provided with a plurality of radially arranged graduations in the form of indentations 12 and numerals 13 are associated with the graduations 12. The dial 10 is provided with openings 14 in the form of light ray projecting windows and a transparent substance 15 of suitable composition is adapted to be mounted within each opening 14. There is an opening 14 disposed through the dial 10 for each graduation 12.

The dial 10 is mounted on a stationary support 16 and a stationary scale or indication means 17 is interposed between the upper portion of the dial 10 and the support 16. The stationary or vernier member 17 is provided with at least one opening 18 which is adapted to register with a selected opening 14 in the dial 10. The support 16 is also provided with an opening 19 registering with the opening 18 and the transparent filler 20 is mounted in the opening 18. A transparent material 21 is mounted in the opening 19. A light 22 is adapted to be positioned beyond the support 16 and the light rays from the light 22 are adapted to be projected through the openings 19, 18 and through an opening 14 which is in registery with the openings 18 and 19.

The vernier member 17 is adapted to be secured to the support 16 by means of bolts or screws 23 and preferably, this vernier member 17 is positioned under the upper portion of the dial 10 as shown in Figure 1. The ratio of movement of the dial 10 relative to the stationary indicating member 17 effected upon rotation of the knob 10 may be any desired ratio. In the event the desired opening 14 in the dial 10 is not in exact registry with the light projecting openings 18 and 19, the amount of light rays passing through the openings 18, 19 and 14 will be an indication to the user of the device that the dial 10 is not in proper position.

In the use of this device, the movable member 10 is adapted to be moved under rotation of the knob 11 and the degree of movement of the dial 10 can be calculated through the registration of a selected opening 14 with the registering openings 18 and 19. With a device of this kind it will be more easy for a person operating the movable member to bring this movable member into more accurate registry with the stationary indicating means in the form of the openings 18 and 19 in the stationary member 17.

This is due to the fact that when the selected opening 14 is in registry with the aligned openings 18 and 19, the light rays from the lamp 22 will be clearly projected through the aligned and registering openings. With a device of this kind the visual indication given by the registering openings and the light projected through the openings will provide a quicker means for determining when the movable member 10 has been moved to the desired degree. Where detents or grooved graduations are used as is at present the case, it is possible to move the movable member slightly out of registry with the stationary member without this position of non-registry being detected by the eye. However, where light rays are projected through the registering openings, the eye can more readily detect the exact moment when the selected opening of the movable member is in registry with the aligned openings of the stationary member.

What I claim is:

1. A vernier means comprising an adjustable opaque member provided on its outer face with spaced marginal graduations, said member being formed therein with spaced light emitting passages each correlated with one of said graduations, a transparent means in each of said passages, a stationary opaque member having at least one light emitting passage, the said adjustable member overlapping and positioned in front of the stationary member, means for adjusting the adjustable member to provide for the selected registry of the axial centers of its light emitting passages with the axial center of the passage of the stationary member, transparent means in the passage of said stationary member, and means for reflecting light rays in a direction for illuminating the transparent means of the axially aligned light emitting passages.

2. A vernier means comprising an adjustable opaque member provided on its outer face with spaced marginal graduations, said member being formed therein with spaced light emitting passages each correlated with one of said graduations, a transparent means in each of said passages, a stationary opaque member having at least one light emitting passage, the said adjustable member overlapping and positioned in front of the stationary member, means for adjusting the adjustable member to provide for the selected registry of the axial centers of its light emitting passages with the axial center of the passage of the stationary member, transparent means in the passage of said stationary member, a support common to said members and being formed with a light emitting passage having its axial center in permanent registry with the axial center of the passage in said stationary member, transparent means in the passage of said support, and means for reflecting light rays in a direction for illuminating the transparent means of the axially aligned light emitting passages.

3. The invention as set forth in claim 2 having each of the light emitting passages of circular form and the graduations on the adjustable member intersecting the light emitting passages in such member diametrically of such passages.

ROSS NEY HAYES.